United States Patent [19]

Miller et al.

[11] 4,417,168
[45] Nov. 22, 1983

[54] PERMANENT MAGNET ROTOR FOR A DYNAMO ELECTRIC MACHINE

[75] Inventors: Timothy J. E. Miller, Schenectady; Donald W. Jones, Burnt Hills, both of N.Y.

[73] Assignee: General Electric Company, Schenectady, N.Y.

[21] Appl. No.: 315,333

[22] Filed: Oct. 26, 1981

[51] Int. Cl.³ .............................................. H02K 21/12
[52] U.S. Cl. ..................................... 310/156; 310/261
[58] Field of Search ............... 310/261, 156, 155, 152, 310/181, 186, 216, 217, 218, 162, 163, 264, 265; 148/105; 324/146

[56] References Cited

U.S. PATENT DOCUMENTS

| | | | |
|---|---|---|---|
| 1,543,347 | 6/1925 | Turner | 310/156 |
| 3,840,763 | 10/1974 | Baumann et al. | 310/156 |
| 3,979,821 | 9/1976 | Noodleman | 310/156 |
| 4,127,786 | 11/1978 | Volkrodt | 310/152 |
| 4,324,996 | 4/1982 | Adelski et al. | 310/156 |
| 4,327,302 | 4/1982 | Hershberger | 310/156 |

*Primary Examiner*—R. Skudy
*Attorney, Agent, or Firm*—William H. Steinberg; James C. Davis, Jr.; Marvin Snyder

[57] ABSTRACT

A two-pole rotor of increased flux concentration factor employs two pole pieces of magnetic material which are separated from each other by non-magnetic segments. The pole pieces and non-magnetic segments are joined together to form a cylinder with an aperture extending axially through the central portion. Two magnets forming a V shaped configuration and polarized such that the inner faces of the magnets have like polarity are positioned in the central portion of the cylinder with the outer sides of the magnets adjacent to one of the pole pieces. The magnets are located symmetrically about the d axis and asymmetrically about the q axis. The magnets extend above and below the q axis. A prism shaped segment of magnetic material is positioned between the magnets with the base of the prism adjacent to the other pole piece to hold the magnet in place. A stub shaft is mounted on each face of the cylinder.

14 Claims, 4 Drawing Figures

PERMANENT MAGNET ROTOR FOR A DYNAMO ELECTRIC MACHINE

This invention relates to permanent magnet dynamo electric machines with the magnet in the rotor of the machine.

Electric generators of alternating current and electric motors excited by alternating current are sometimes excited by means of permanent magnets because this leads to machines of simple, robust construction having high efficiency and being free of slip rings and commutators.

In any class of electric machinery it is usually desirable to achieve a predetermined power output from the smallest volume of material to minimize costs. In a machine with a rotor containing permanent magnets, minimizing the magnet volume greatly reduces machine costs since magnet cost is the dominant material cost of the machine.

Optimum flux density is defined as the flux density in the magnet which maximizes the stored magnetic energy per unit volume in the magnet and therefore leads to a design in which magnet volume, weight and cost are minimized. The optimum flux density that maximizes the utilization of the magnets may be less than half the flux density that is desired in the air gap of the machine, to minimize the volume of the whole machine.

It is an object of the present invention to provide in an electrical machine a permanent magnet rotor that establishes a sufficiently strong magnetic field in the air gap between the rotor and the stator by using permanent magnets whose optimum field density is much lower than that required in the air gap.

It is a further object of the present invention to achieve a flux concentration greater than is possible in any symmetrical two pole permanent magnet machine.

SUMMARY OF THE INVENTION

In one aspect of the present invention, a twopole rotor has two pole pieces of magnetic material which are separated from each other by non-magnetic segments. The pole pieces and non-magnetic segments are joined together to form a cylinder with an aperture extending axially through the central portion. Two magnets forming a V shaped configuration and polarized such that the inner faces of the magnets have like polarity are positioned in the central portion of the cylinder with the outer sides of the magnets adjacent to one of the pole pieces. The magnets are located symmetrically about an axis called the d axis and asymmetrically about the q axis which passes through the center of the cylinder and is orthogonal to the d axis. The magnets extend above and below the q axis. A prism shaped segment of magnet material is positioned between the magnets with the base of the prism adjacent to the other pole piece and to hold the magnets in place and allow the rotor to exhibit a high flux concentration factor. A stub shaft is mounted on each face of the cylinder.

In another aspect of the present invention the prism is split parallel to the direction of flux and a resilient pad or planar spring is positioned between the two sections to add to the centrifugal load on the magnets and help keep the magnets firmly in place while allowing some resilience to accommodate thermal strain and any irregularities of the meeting surfaces.

BRIEF DESCRIPTION OF THE DRAWING

While the specification concludes with claims particularly pointing out and distinctly claiming the present invention, the objects and advantages can be more readily ascertained from the following description of a preferred embodiment when read in conjunction with the accompanying drawing in which:

FIG. 3 is an end view of the rotor with the stub shaft removed; and

FIG. 4 is a cross section of the rotor of FIG. 1 showing a pole piece having an arc reduced by slotting.

DETAILED DESCRIPTION OF THE INVENTION

Figure 1:
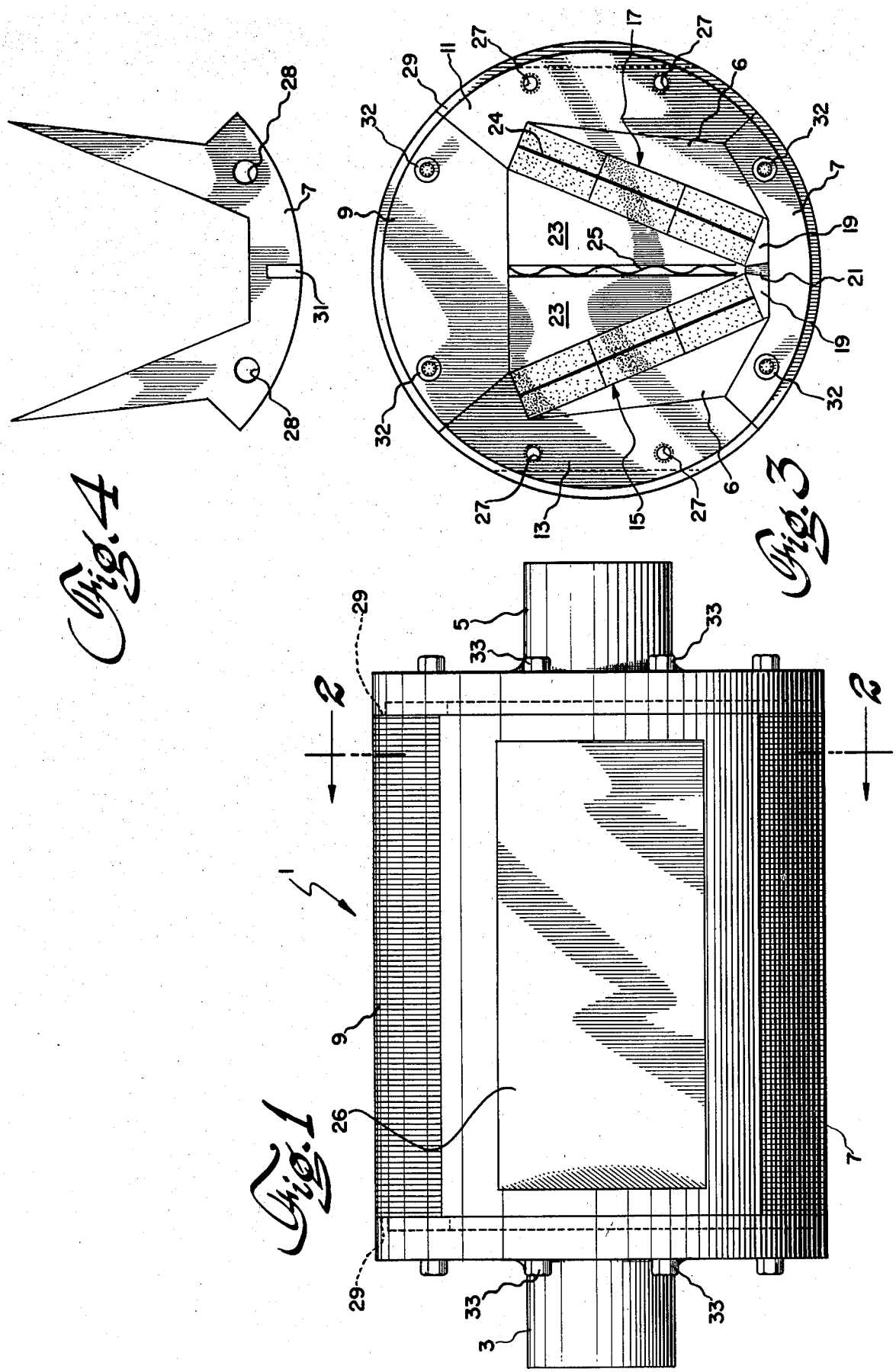
FIG. 1 is a side elevation view of the rotor of the present invention.

Referring now to the drawings and particularly FIG. 1 thereof, there is shown a cylindrical rotor 1 having stub shafts 3 and 5, one mounted on either face. The cross section view of the rotor shown in FIG. 2, reveals a north and south pole piece, 7 and 9, respectively, of laminated magnetic material such as iron situated within the rotor. The pole pieces 7 and 9 are attached to non-magnetic segments 11 and 13 by edge brazing, electron beam welding or other suitable means to form a cylinder defining a central aperture extending axially through the cylinder. The non-magnetic segments can be austenitic stainless steel. Two magnet blocks 15 and 17 are positioned inside the central aperture in a V shaped configuration with the outer sides of the two magnets adjacent to the pole piece 7. The magnets are polarized so that their sides on the inner portion of the V are poled alike. The magnets are positioned symmetrically about the d axis of the rotor and asymmetrically about the q axis with the magnets extending above and below the q axis. The d axis is defined as an axis of symmetry of the waveform of radial flux density in the air gap with the stator windings open circuited. With pole pieces having an axis of symmetry in the radial direction as is the case in the illustrated embodiment, the axis of symmetry in the radial direction of the pole pieces is also coincident with the d axis. The q axis is defined as rotated 90 electrical degrees from the d axis about the center of the rotor. In the two-pole rotor shown 90 electrical degrees corresponds to 90 mechanical degrees.

A filler piece 19 of non-magnetic material such as stainless steel is located at the base of the V configured magnets to prevent the magnets from contacting each other and to define their positions parallel to the major interior sides of portion 6 of the pole piece 7. A saturable bridge 21 of magnetic material separates the filler piece 19 into two portions so that flux flowing between the magnets crosses the saturable bridge allowing the flux distribution between the two rotor poles to be trimmed. Portion 6 of pole piece 7 adjacent to each of the outside faces of magnets 15 and 17 can be of solid magnetic material since laminating is not necessary to reduce eddy current heating because the solid sections are located on the interior of the rotor.

Magnet blocks 15 and 17 can be built up of smaller magnet block segments 15a–15f and 17a–17f, respectively, such that several layers are possible in the axial and transverse directions. To add strength in tension, sheets 24 of ferromagnetic material such as iron nickel alloys matching thermal expansion characteristics of the magnets, can be adhesively bonded to the magnet segments normal to the direction of flux. An alloy of 53% iron, 17% cobalt and 29% nickel can be used, such as Fernico, for example, with cobalt samarium magnets. This alloy is described in more detail in the American Society for Testing and Materials Standard Specification ASTM-F-15, which is hereby incorporated by reference. The ferromagnetic material is bonded with epoxy or other resin between the magnet layers to form large magnet blocks having improved structural characteristics. Since the material used between the segments is ferromagnetic, flux through the magnet is not interrupted.

The magnets 15 and 17 are wedged into position by a prism section 23 of magnetic material such as iron. The prism can be axially sectioned for long rotors. The prism section is split along a plane parallel to a flux line which is also a line of symmetry in the embodiment illustrated. The two halves of the prism are separated by a resilient pad or planar spring 25 which can be an array of Belleville washers or a corrugated sheet of spring steel. The width of the planar spring 25 is narrow compared to the average width of the prism and since the split in the prism is parallel to the direction of flux, the split has a negligible effect on the permeance of the main magnetic circuit. The base of the prism is adjacent to the south pole piece 9. The prism compresses the magnets against the inside surface of portion 6 of the north pole piece 7. The spring load from the planar spring 25 adds to the centrifugal load on the magnets and helps keep the magnets firmly in place while allowing some resilience to accommodate thermal strains and any irregularities of the meeting surfaces.

Figure 2:
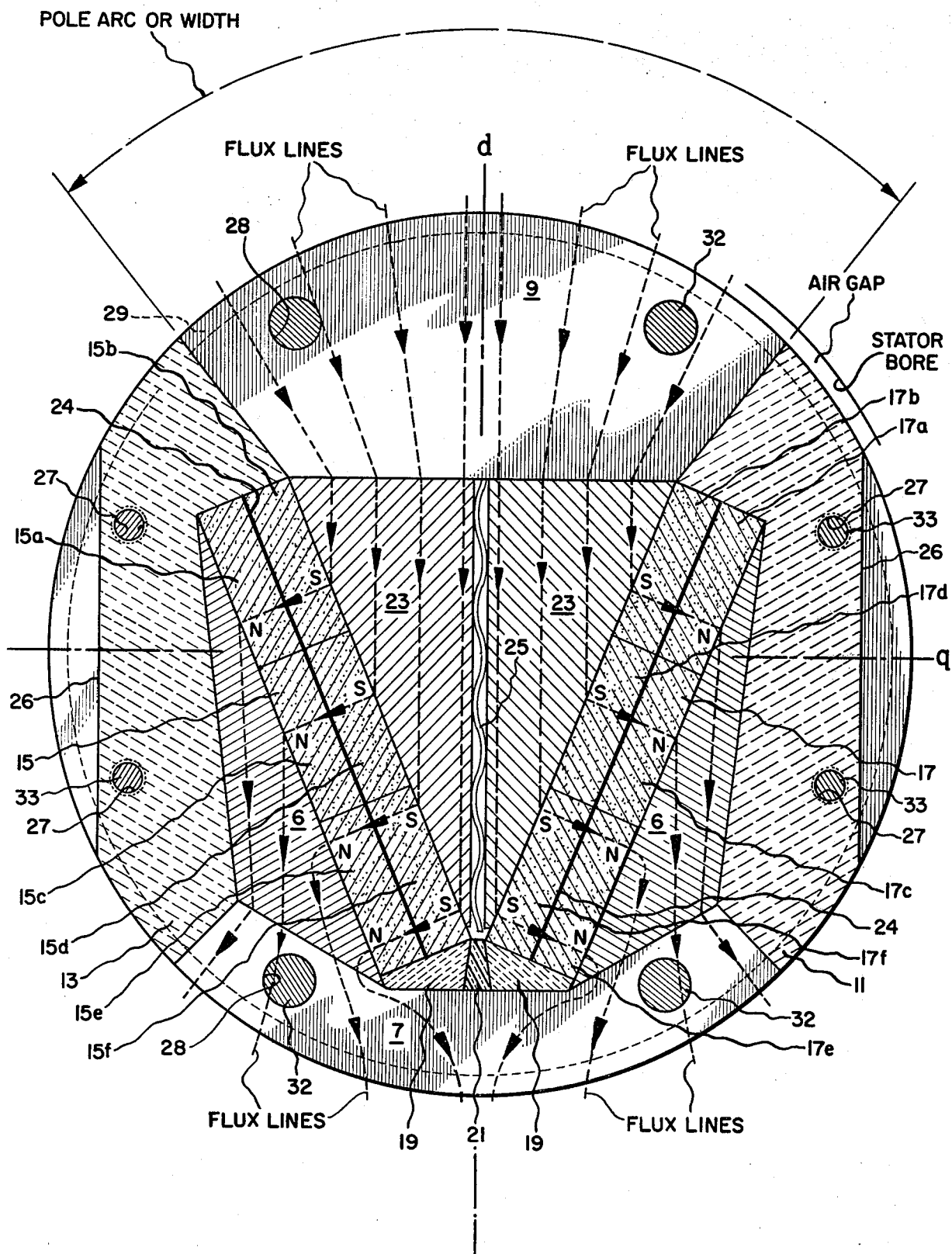
FIG. 2 is a cross section of the rotor of FIG. 1 taken along the line 2—2 in FIG. 1.

Flats are milled to form a recess 26 on the nonmagnetic segments 11 and 13 in FIG. 2 thus increasing the air gap between the stator and the non-magnetic segments and reducing eddy-current losses in the nonmagnetic segments arising from slot harmonics in the stator magnetomotive force.

Threaded bolt holes 27 are provided on either face, extending into the rotor non-magnetic segments 11 and 13. Stud holes 28 extend axially through pole pieces 7 and 9.

Referring to FIG. 3, studs 32 having shoulders are used in the pole piece sections to provide stiffness the shoulders of the studs being flush with the pole surfaces to control compression forces on the relatively soft material. The end faces of the rotor have a rabbeted edge 29 about their periphery into which the stub shafts 3 and 5 extend. The rabbeted edge improves rotor rigidity. Bolts 33 extend through the stub shafts into bolt holes 27. Threaded studs 32 also extend through the stub shafts and have a nut on either end.

The whole rotor 1 may be immersed in a suitable liquid resin which sets solid in the voids in the planar spring and elsewhere, in order to further prevent any relative motion of the parts. Alternatively, a low temperature casting metal such as zinc or type metal may be used. Vent holes in the stub shafts can be provided to allow the material to fill the voids in the rotor. The rotor can be used with conventional AC stators.

The magnetic field in the air gap in the present invention is achieved using permanent magnets whose optimum flux density is much lower than, and typically one-half, that which is required in the air gap. This is accomplished by using flux concentration. The magnet pole faces are oriented obliquely to the desired direction of magnetic flux and a flux concentration is achieved which is limited by the saturation characteristics of the soft iron flux guides or pole pieces 7 and 9. Pat. No. 3,840,763 issued Oct. 8, 1974 to Baumann and Rosenberry and assigned to the instant assignee describes an arrangement of permanent magnets in a V shaped configuration having polar symmetry or uniformity. Rotors having polar symmetry or uniformity have the same arrangement of magnets under each pole. In the present invention, polar symmetry is abandoned. The arrangement of magnets under the north pole is different from the arrangement of magnets under the south pole. The V shaped magnets in the present invention extend below the quadrature axis which is a line of symmetry in a rotor having polar symmetry. The asymmetry of the present invention allows more space to be available for the V shaped magnets than if polar symmetry were retained. Utilization of the additional space results in increased magnet pole area since the pole area of the magnets is proportional to the width of the magnets used, while at the same time the angle between the magnets can be made smaller for any given width of magnet. The width of the magnet is measured transverse to the direction of magnetization. Both of these consequences of asymmetry about the q axis lead to an increase in the flux concentration factor which may be defined as the ratio of the magnet pole area to the rotor pole face area at the air gap. The flux path in the rotor is shown in FIG. 2 where lines of flux are shown leaving the north face of the magnets 15 and 17 through pole piece 7 to the air gap. Flux enters the stator (not shown) and re-enters the rotor and pole piece 9 and passes through the magnetic prism 23 to the south face of the magnets 15 and 17.

A disadvantage of the polar asymmetry is the possibility of having unequal magnetic potential differences across the two air gaps adjacent to the opposite rotor pole faces. This could result in the generation of unbalanced fluxes as well as shaft flux, both of which are undesirable. In order to compensate for the unequal potential differences at the two air gaps, unequal air gap lengths adjacent the rotor pole faces can be provided. The required difference in air gap lengths can be determined by numerical field analysis. The saturable magnetic bridge 21 can also help to compensate the magnetic asymmetry. The narrow width of the bridge causes the magnetic potential difference across the bridge to saturate it. The bridge cannot, by itself, equalize potential differences across the rotor air gaps but is useful for "trimming" purposes, i.e., making minor adjustments. The pole arcs or pole widths can be different, with the pole piece 9 facing the open end of the V arranged magnets having a wider pole arc or pole width than the other pole piece. Alternatively, a slot could be cut in the pole piece facing the apex of the V arranged magnets rather than making the poles of unequal arc or width and, as shown in FIG. 4, the slot in the pole piece 7 may be filled with a nonmagnetic material 31 which may be secured in place, for example, by brazing.

The foregoing describes a permanent magnet rotor for a dynamo electric machine which supplies a sufficiently strong magnetic field in the air gap between the rotor and the stator using permanent magnets whose optimum flux density is much lower than is required in the air gap and achieves a flux concentration greater than is possible in any symmetrical two pole permanent magnet machine.

It is understood that the foregoing detailed description is given merely by way of illustration and many modifications can be made therein without departing from the spirit or scope of the present invention.

What is claimed is:

1. A two pole permanent magnet rotor for a dynamo electric machine comprising:

two pole pieces of magnetic material;

two non-magnetic segments separating said pole pieces and forming a cylinder, said cylinder having an aperture extending axially through the central portion thereof;

two magnets arranged in a "V" configuration polarized such that the inner faces of said "V" configuration magnets have like polarity, said magnets located in the aperture symmetrically about the d axis and asymmetrically located above and below the q axis, the q axis passing through the center of said cylinder and orthogonal to the d-axis;

means for holding said magnets in said aperture such that the outer faces of said "V" configuration magnets are adjacent to one of said pole pieces and for conducting flux between the inner magnet faces and the other of said pieces, said means for holding said magnets in the aperture comprising a prism of magnetic material positioned adjacent to the inner face of said "V" configuration magnets, said prism including said first and second prism sections separated along a plane parallel to a flux line, and a planar spring disposed between said sections; and shaft means attached to both faces of said cylinder.

2. The rotor of claim 1 wherein the pole arcs of said two poles are unequal, the pole arc of the pole adjacent the open side of the V configured magnets being greater than the pole width of the other pole.

3. The rotor of claim 1 further comprising:

a saturable magnetic bridge positioned at the junction of said magnets.

4. The rotor of claim 1 wherein said pole adjacent the apex of the V formed by said magnets comprises a pole having a slot and nonmagnetic material positioned in the slot.

5. A two pole permanent magnet rotor for a dynamo electric machine comprising:

two pole pieces of magnetic material;

two non-magnetic segments separating said pole pieces and forming a cylinder, said cylinder having an aperture extending axially through the central portion thereof;

two magnets arranged in a "V" configuration polarized such that the inner faces of said magnets have like polarity, said magnets located in the aperture symmetrically about the d axis and asymmetrically located above and below the q axis, the q axis passing through the center of said cylinder and orthogonal to the d-axis, each of said magnets comprising a plurality of magnet segments and a plurality of sheets of ferromagnetic material, each sheet adhesively bonded between said magnet segments and extending in a direction substantially normal to the direction of flux passage therethrough;

means for holding said magnets in said aperture such that the outer faces of said "V" configuration magnets are adjacent to one of said pole pieces and for conducting flux between the inner magnet faces of said "V" configuration magnets and the other of said pole pieces, and shaft means attached to both faces of said cylinder.

6. The rotor of claim 5 wherein the thermal expansion characteristics of said ferromagnetic sheets are substantially identical to those of said magnet segments.

7. The rotor of claim 6 wherein said magnets comprise cobalt samarium magnets and said ferromagnetic strips comprise an alloy of 53% iron, 17% cobalt and 29% nickel.

8. A rotor for a permanent magnet motor comprising:

two pole pieces of magnetic material;

two nonmagnetic segments separating said pole pieces, said nonmagnetic segments being joined to said pole pieces forming a cylinder having an aperture extending through the central portion thereof;

a permanent magnet located in the aperture for providing magnetic flux to said pole pieces;

expansion means for compressing said magnet against the inner portion of said cylinder; and shaft means attached to both faces of said cylinder.

9. The rotor of claim 8 wherein said expansion means comprises a first and second section of magnetic material separated along a plane parallel to a flux line and spring means disposed between said sections.

10. The rotor of claim 8 wherein said pole pieces are welded to said nonmagnetic segments to form the cylinder.

11. The rotor of claim 8 wherein said pole pieces are brazed to said nonmagnetic segments to form the cylinder.

12. The rotor of claim 8 wherein said magnet comprises:

a plurality of magnetic segments and a plurality of sheets of ferromagnetic material, each sheet adhesively bonded between said magnet segments and extending in a direction substantially normal to the direction of flux passage therethrough.

13. The rotor of claim 12 wherein the thermal expansion characteristics of said ferromagnetic sheets are substantially identical to those of said magnet segments.

14. The rotor of claim 13 wherein said magnets comprise cobalt samarium magnets and said ferromagnetic strips comprise an alloy of 53% iron, 17% cobalt and 29% nickel.

* * * * *